Jan. 14, 1964   A. WINKLER   3,118,014
VIEW FINDER WITH ADJUSTABLE FRAMING PLATES FOR
CAMERAS WITH INTERCHANGEABLE OBJECTIVES
Filed Jan. 16, 1957

INVENTOR.
Alfred Winkler
BY Michael S. Striker
Attorney 3,118,014
VIEW FINDER WITH ADJUSTABLE FRAMING PLATES FOR CAMERAS WITH INTERCHANGEABLE OBJECTIVES
Alfred Winkler, Munich, Germany, assignor to Agfa Aktiengesellschaft, Leverkusen, Germany
Filed Jan. 16, 1957, Ser. No. 634,440
Claims priority, application Germany Jan. 19, 1956
8 Claims. (Cl. 88—1.5)

This invention relates to view finders for cameras of the type adapted to employ interchangeably two or more objectives of different focal length. In the use of a camera in many cases the finder is relied upon both for pointing the camera and for showing the limits of the effective coverage of the lens system of the camera. In such cases it is important that the finder be arranged so that its field of view shall correspond accurately with the field covered by the camera. In order with such arrangements to render visible in the view finder the size of field corresponding to the objective in use, field limits corresponding to the focal length of the interchangeable objective, have been reflected in the view finder in such a manner that at any one time only one field frame is visible.

The principal object of the invention is the provision of two plates rotatably arranged with respect to one another each of the plates having a plurality of perforations.

According to the invention the preforations of one plate are caused to register at least partly with perforations in the other plate at least in a number of different relative positions of the plates corresponding to the number of objectives.

It is an object of the invention that the points of register are in each case arranged to indicate the field of view corresponding to a different one of the interchangeable objectives.

Figure 1:
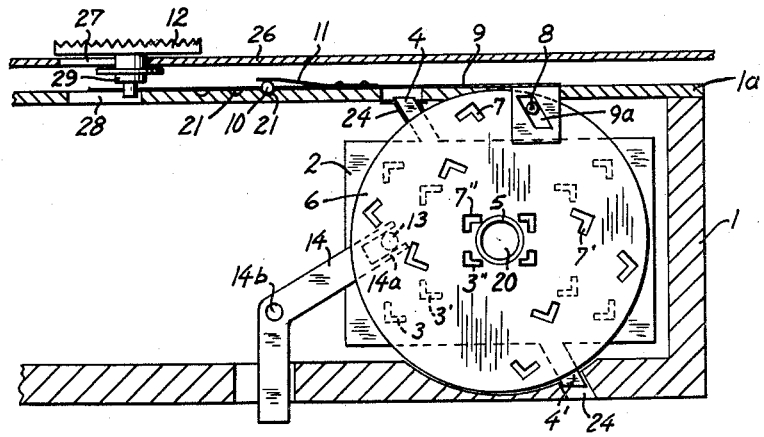
Figure 2:
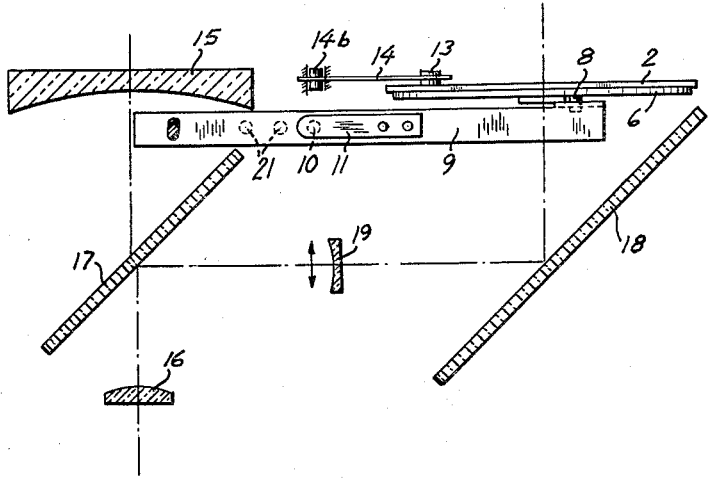
Figure 3:
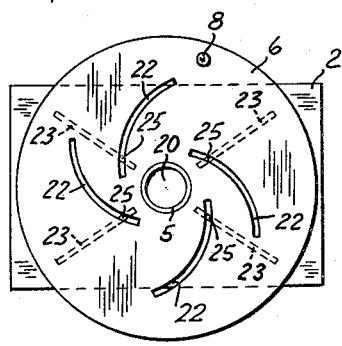

Other objects and advantages will be apparent and pointed out in the course of the following description in connection with the accompanying drawings, in which:

FIG. 1 is an elevation in part section of a "multiple" device for indication of the field limits, arranged in the view finder housing, FIG. 2 is a diagrammatic plan representation of the device shown in FIG. 1 in combination with a range finder and FIG. 3 is an elevation of part of a "universal" device for continuous field limitation.

Referring to the drawings, in a view finder housing 1 is provided a plate 2 with lugs 4, 4' arranged to slide in guide slots 24 in the housing arranged parallel to the resultant parallax movement. In the center of the plate 2 is a collar 5 which forms the bearing for a rotatable disc 6. The plate 2 has perforations 3, 3', 3''. In the disc 6 are arranged corresponding perforations 7, 7', 7'' which have an angular displacement with respect to one another and are somewhat larger than the perforations in the plate 2. The latter are so arranged that on rotation of the disc 6 they come into register in turn with the perforations of the latter, so that only one indication of field limits is visually apparent at any one time. FIG. 1 illustrates the position in which the perforations 7'' and 3'' are in register thereby indicating the smallest field provided around the hollow bearing 5. In this position the frames corresponding to 3 and 3' do not appear. On rotation of the disc 6 in a counter-clockwise direction the other field limiting perforations come into register in turn giving only one field indication at one time.

FIG. 3 indicates an arrangement for the continuous indication of field limits. For this purpose the disc 6 is provided with spiral-formed perforations 22, while the plate 2 has diagonal slots 23. When the disc 6 is rotated four points of register 25 of the two sets of perforations continuously appear providing visual means of field recognition. It is further possible to utilize the hollow bearing 5 fixed on the plate 2 as a means of limitation of the range finder field 20.

Fixed to the disc 6 is a pin 8 which slides in a guide slot 9a, see FIG. 1, which is provided in a slider 9 which is attached to an adjustment device 12 for the different focal lengths. The slider 9 is shown by way of example on the cover 1a of the view finder housing 1 and is retained in a number of alternative adjusted positions by a ball catch device 10, 21 under loading by a spring 11. The adjustment device for the different focal length is in the form of a knob 12 arranged in the upper part 26 of the camera. As is seen from FIG. 1, the guide slot 9a for the pin 8 is arranged parallel to the resulting parallax movement.

To the plate 2 is fixed a pin 13 which is engaged by the fork-shaped end 14a of a lever 14 pivoted on a pin 14b. On pivoting of the lever 14, the whole device is controlled as regards parallax. The actuation of the lever 14 can take place either by the the objective itself or by a control member within a range finder. Moreover the adjustment of the field limitation can either be effected by hand or by means of the interchangeable objective. Finally the control both of the field limitation and the parallax compensation can be effected by means of the objective.

In FIG. 2 the invention is shown in co-operation with a coupled range finder. In FIG. 2, 15 is the field lens of a direct vision optical view finder and 16 the corresponding eye piece. 17 is a half-mirrored plate and 18 a deflecting mirror. The perforations 3, 3', 3'' shown in FIG. 1, lie in the focal plane of the lens 16 (see FIG. 2), so that they are projected at infinity. By means of the lens 19 which is controlled according to the distance of the object and which corresponds to the field lens 15, the comparison image of the coupled range finder can be introduced. As also shown in FIG. 2, the plate 2 and the disc 6 are arranged in the path of light rays entering the range finder.

What is claimed as new and desired to be secured by Letters Patent is:

1. In a view finder of a camera adapted to have a plurality of objectives of different focal lengths interchangeably connected thereto, in combination, a first plate formed with a plurality of apertures respectively located at the corners of a plurality of rectangular areas of different sizes respectively having centers located at a common point and each rectangular area having its sides parallel to the sides of the next rectangular area, a second plate formed with a plurality of apertures respectively located at the corners of a plurality of rectangular areas which are respectively identical in size with the rectangular areas of said first plate, the centers of the rectangular areas of said second plate also being located at a common point and the rectangular areas of said second plate being angularly offset with respect to each other; and means interconnecting said plates for turning movement one with respect to the other about an axis passing through the common center points of all of said rectangular areas and said plates being located one next to the other so that at different angular positions of said plates with respect to each other the apertures at the corners of only one rectangular area of said second plate will register with the apertures at the corners of the rectangular area of said first plate which is of the same size as said one rectangular area, whereby when the apertures of said plates are projected into the viewing field of the view finder said plates may be placed at an angular position with respect to each other which indicates in the view finder the size of the field of a particular objective which is connected to the camera.

2. In a view finder of a camera adapted to have a plurality of objectives of different focal lengths interchangeably connected thereto, in combination, a first plate formed with a plurality of apertures respectively located at the corners of a plurality of rectangular areas of different sizes respectively having centers located at a common point and each rectangular area having its sides parallel to the sides of the next rectangular area; a second plate formed with a plurality of apertures respectively located at the corners of a plurality of rectangular areas which are respectively identical in size with the rectangular areas of said first plate, the centers of the rectangular areas of said second plate also being located at a common point and the rectangular areas of said second plate being angularly offset with respect to each other, each of said plates being formed with a circular aperture having the center at said common points, respectively; and means interconnecting said plates for turning movement one with respect to the other about an axis passing through the common center points of all of said rectangular areas and said plates being located one next to the other so that at different angular positions of said plates with respect to each other the apertures at the corners of only one rectangular area of said second plate will register with the apertures at the corners of the rectangular area of said first plate which is of the same size as said one rectangular area, whereby when the apertures of said plates are projected into the viewing field of the view finder said plates may be placed at an angular position with respect to each other which indicates in the view finder the size of the field of a particular objective which is connected to the camera, said first plate masking, at any given time, all of the apertures of said second plate except those at the corners of a selected rectangular area of said second plate which register with the apertures of the rectangular area of said first plate which is of the same size as said selected area of said second plate while said circular apertures will remain in registration for any angular position of said plates with respect to each other.

3. In a view finder of a camera adapted to have a plurality of objectives of different focal lengths interchangeably connected thereto, in combination, a pair of plates located next to each other and turnably connected with each other for turning movement one with respect to the other about a given axis, said plates being formed with cutouts spaced from said axis and with circular apertures having the centers at said axis, and the cutouts of one of said plates registering with the cutouts of the other of said plates at the corners of rectangular areas of different sizes when said plates are respectively at different angular positions with respect to each other, each plate completely masking the cutouts of the other plate except for the registering of the cutouts at the corners of said rectangular area while said circular apertures will remain in registration for any angular position of said plates with respect to each other, so that the registering cutouts may be projected into the field of vision of a view finder for indicating the size of the viewing field of a particular objective.

4. In a view finder of a camera adapted to have a plurality of objectives of different focal lengths interchangeably connected thereto, in combination, a pair of plates located next to each other and turnably connected with each other for turning movement one with respect to the other about a given axis, said plates being formed with cutouts spaced from said axis and with circular apertures having the centers at said axis, and the cutouts of one of said plates registering with the cutouts of the other of said plates at the corners of rectangular areas of different sizes when said plates are respectively at different angular positions with respect to each other, each plate completely masking the cutouts of the other plate except for the registering of the cutouts at the corners of said rectangular area while said circular apertures will remain in registration for any angular position of said plates with respect to each other, so that the registering cutouts may be projected into the field of vision of a view finder for indicating the size of the viewing field of a particular objective, the rectangular area at the corners of which said cutouts register continuously changing in size during turning of one of said plates with respect to the other.

5. In a view finder of a camera adapted to have a plurality of objectives of different focal lengths interchangeably connected thereto, in combination, a pair of plates located next to each other and turnably connected with each other for turning movement one with respect to the other about a given axis, said plates being formed with cutouts spaced from said axis and with circular apertures having the centers at said axis, and the cutouts of one said plates registering with the cutouts of the other of said plates at the corners of rectangular areas of different sizes when said plates are respectively at different angular positions with respect to each other, each plate completely masking the cutouts of the other plate except for the registering of the cutouts at the corners of said rectangular area while said circular apertures will remain in registration for any angular position of said plates with respect to each other, so that the registering cutouts may be projected into the field of vision of a view finder for indicating the size of the viewing field of a particular objective, one of said plates being stationary and the other of said plates being turnable and in the form of a disc, said stationary plate being formed with four slots extending radially from the turning axis along diagonals of all of the rectangular areas and said disc being formed with four helical slots respectively overlapping said radial slots at different radial distances from the turning axis when said disc is turned to different angular positions.

6. In a camera adapted to have a plurality of objectives of different focal lengths interchangeably connected therewith, in combination, view finder means having an entrance aperture through which light enters into the view finder means; and only two plates located in the immediate vicinity of said entrance aperture of said view finder means and turnably connected to each other for angular turning one with respect to the other, each of said plates being formed with cutouts and the cutouts of one plate registering with the cutouts of the other plate only at the corners of rectangular areas of different sizes when said plates are at different angular positions with respect to each other so that the registering cutouts may be viewed in the view finder means to indicate the field of a particular objective.

7. In a camera adapted to have a plurality of objectives of different focal lengths interchangeably connected therewith, in combination, a combined view and range finder means including a circular member through which light enters for passage through the range finder, so that said circular member limits the range finder light; and only two plates carried by said circular member without extending into the area surrounded thereby and at least one of said plates being turnably supported by said circular movement for turning movement with respect to the other of said plates, each plate being formed with a plurality of cutouts and the cutouts of one plate registering with the cutouts of the other plate only at the corners of rectangular areas of different sizes when said plates are at different angular positions with respect to each other so that the registering cutouts of said plates may be projected into the view finder to indicate the size of the field of a particular objective which is connected with the camera.

8. In a view finder of a camera adapted to have a plurality of objectives of different focal lengths interchangeably connected thereto, in combination, a first plate formed with a plurality of apertures respectively located at the corners of a plurality of rectangular areas of different sizes respectively having centers located at a common point and each rectangular area having its sides parallel to the sides of the next rectangular area; a second circular plate formed with a plurality of apertures respectively located at the corners of a plurality of rectangular areas which are respectively identical in size with the rectangular areas of said first plate, the centers of the rectangular areas of said second plate also being located at a common point coinciding with the center of said circular plate and the rectangular areas of said second plate being angularly offset with respect to each other; means interconnecting said plates for turning movement one with respect to the other about an axis passing through the common center points of all of said rectangular areas and said plates being located one next to the other; and means operatively connected to said second plate for turning the same about said axis so as to bring the apertures at the corners of one rectangular area of said second plate into registry with the apertures at the corners of the rectangular area of said first plate which is of the same size as said one rectangular area.

References Cited in the file of this patent

UNITED STATES PATENTS

| | | |
|---|---|---|
| 1,181,453 | Hyler | May 2, 1916 |
| 2,187,246 | Nerwin | Jan. 16, 1940 |
| 2,406,807 | Colbath | Sept. 3, 1946 |
| 2,737,844 | Jerome et al. | Mar. 13, 1956 |
| 2,805,608 | Leitz et al. | Sept. 10, 1957 |

FOREIGN PATENTS

| | | |
|---|---|---|
| 123,924 | Australia | Mar. 27, 1947 |